United States Patent [19]
Krenek

[11] Patent Number: 6,106,209
[45] Date of Patent: Aug. 22, 2000

[54] TRAILER FOR HAY BALES

[76] Inventor: Edward A. Krenek, Rte. 3, Box 352, Wharton, Tex. 77488

[21] Appl. No.: 09/273,085

[22] Filed: Mar. 19, 1999

[51] Int. Cl.$^7$ ...................................................... A01D 87/12
[52] U.S. Cl. ........................................... 414/24.5; 414/470
[58] Field of Search .................................. 414/24.5, 24.6, 414/111, 470; 298/17.5

[56] References Cited

U.S. PATENT DOCUMENTS

| | | |
|---|---|---|
| 1,541,457 | 6/1925 | Winn . |
| 1,545,890 | 7/1925 | Fowler . |
| 3,143,797 | 8/1964 | Eckersall . |
| 3,536,214 | 10/1970 | Sorg et al. . |
| 3,884,158 | 5/1975 | Rumell . |
| 4,109,809 | 8/1978 | Clark . |
| 4,411,572 | 10/1983 | Hostetler ................................ 414/24.5 |
| 5,123,800 | 6/1992 | Druse, Sr. ............................... 414/24.5 |
| 5,137,412 | 8/1992 | McAdams et al. ..................... 414/24.5 |
| 5,180,271 | 1/1993 | Fardejn .................................. 414/24.5 |
| 5,560,191 | 10/1996 | Finney et al. . |
| 5,580,205 | 12/1996 | Frystak . |

OTHER PUBLICATIONS

Hay Van, Round Bale Handling Equipment, The Maintenance Free Answer Year Round, Hay Van Company, Boswell, Oklahoma, United States of America.

Hay King, Round Bale Equipment, K and M Manufacturing Company, Inc., Taylor, Texas, United States of America.

*Primary Examiner*—Gregory A. Morse
*Attorney, Agent, or Firm*—Gary L. Bush; Mayor, Day, Caldwell & Keeton L.L.P.

[57] ABSTRACT

A hay bale trailer (10) for transporting and unloading cylindrical hay bales (B) having a plurality of cradle assemblies (16) supported on the trailer (10) with each cradle assembly (16) including a cradle (22) mounted for tilting movement about a horizontal axis (34) between opposed sides of the trailer (10) to permit selective unloading of cylindrical hay bales (B) from a desired side of the trailer (10). Each cradle assembly (16) includes a turntable (35) on which a cradle (22) is mounted for pivotal movement about a vertical axis (46). Upon unlocking of cradles (22) by removal of locking pins (54) from openings (36), the cradle can be manually pivoted for dumping. Springs (76) return cradle (22) to a hauling position. Cradle assemblies (16) as shown in FIG. 10 can be simultaneously unlocked for individual dumping. Actuating rod (100) unlocks levers (66).

15 Claims, 6 Drawing Sheets

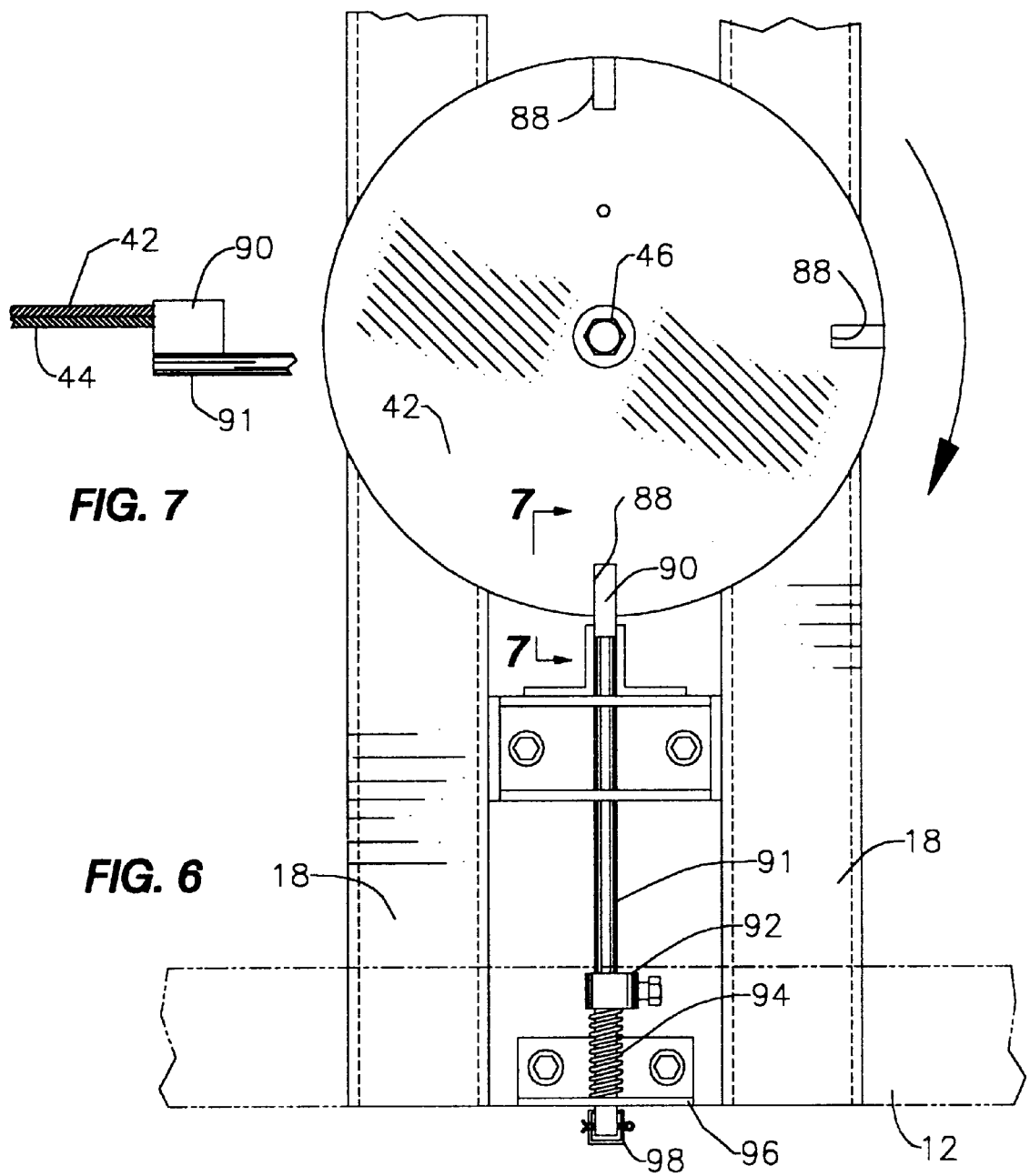

TRAILER FOR HAY BALES

BACKGROUND OF THE INVENTION

1. Field of the Invention

This invention relates to a trailer for the transport of cylindrical hay bales, and more particularly, to such a trailer having a plurality of cradles for supporting a plurality of hay bales thereon for transport.

2. Description of the Prior Art

Hay bales today are of a cylindrical shape having a diameter of about 6 to 8 feet and an axial length of about 8 to 12 feet. The weight of such a hay bale is between about 1200 to 1400 pounds. Prior art trailers have cradles for supporting the hay bale on the trailer for transport. In one case, the cylindrical bales are placed such that the longitudinal axes are perpendicular to the center line of the trailer. In this situation, a spear-type loader inserts a pointed rod into the end of a cylindrical bale and lifts the bale onto the cradle. The cradles have opposed open ends so that the cylindrical bale may be easily positioned on the cradle. The hay bale is removed from the trailer for unloading with the spear-type loader and pointed rods inserted within the bales.

The cradles may be mounted onto the trailer with the longitudinal axis or open ends of the cradles parallel to the center line of the trailer. Cradles may be pivotally mounted with respect to the trailer so that a bale, once placed in the cradle, may be "dumped" from the side of the trailer. The bales may be loaded with a fork-type loader having tines which puncture a side of the cylindrical bale, not the end of the bale. A spear-type loader cannot be used in loading cylindrical bales from the side of the trailer.

It is an object of the present invention to provide a trailer having cradles mounted on the trailer which are adapted to be loaded from either a fork-type loader lifting from the side of the cylindrical hay bales, or a spear-type loader which inserts a pointed rod into the end of the cylindrical bale for lifting the bale onto the cradles.

SUMMARY OF THE INVENTION

The present invention is particularly adapted to a hay bale trailer for transporting or unloading hay bales including a plurality of open ended cradles supported on the trailer for pivotal movement about a vertical axis between the position in which the open ends of the cradle extend axially of the trailer and another position at right angles to the first position in which the open ends of the cradles extend transversely of the trailer. Further, the cradles are mounted for tilting movement about a horizontal axis on the trailer for unloading of the hay bales supported on the cradles either from a side of the trailer or from an end of the trailer. The cradles are mounted on a turntable so that the cradles can be positioned in three separate positions, one position for unloading from one side of the trailer, a second position for unloading from the opposite side of the trailer, and a third position for unloading from the end of the trailer. The cradles are mounted on turntables which are arranged and designed for selective rotational movement of 180 degrees for positioning of the cradles at selective positions as desired. A manual actuator is provided which is operatively connected to all of the cradles for simultaneous unlocking of the cradles so that they can be individually pivoted for dumping of the hay bales from the cradles from a selected side of the trailer.

Other features and advantages of the invention will be apparent from the following specification and drawings.

BRIEF DESCRIPTION OF THE DRAWINGS

FIG. 6 is a top plan view of the releasable locking means for controlling the rotation of the turntable;

FIG. 7 is a section taken generally along line 7—7 of FIG. 6;

DESCRIPTION OF THE INVENTION

As indicated, hay bales are loaded and unloaded by either a spear-type loader or a fork-type loader. The spear-type loader employs rods which penetrate the hay bales. The fork-type loader utilizes forks or tines which are positioned beneath the for lifting the bale for positioning within the cradles. The hay bales may be unloaded by manual pivoting of each cradle from a selected side or end of the trailer.

Figure 1:
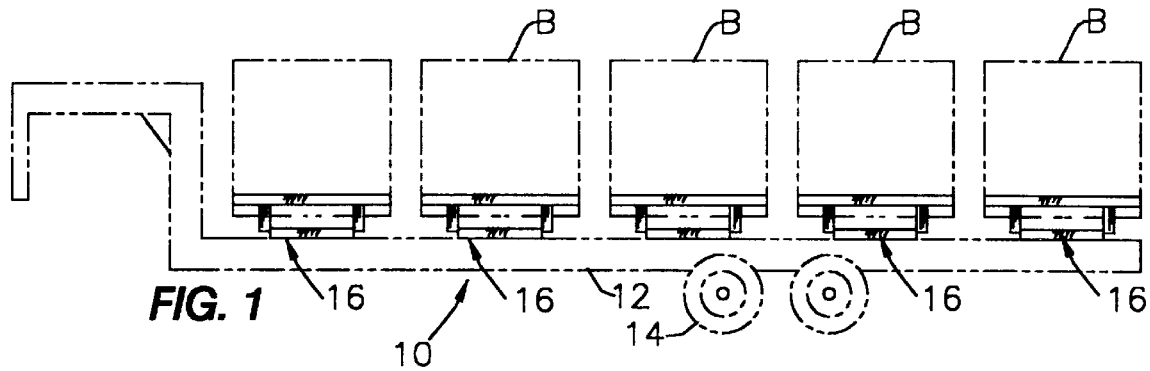
FIG. 1 is a schematic drawing of the hay bale trailer comprising the present invention having a plurality of cradles mounted thereon for unloading from a side of the trailer.
Figure 2:
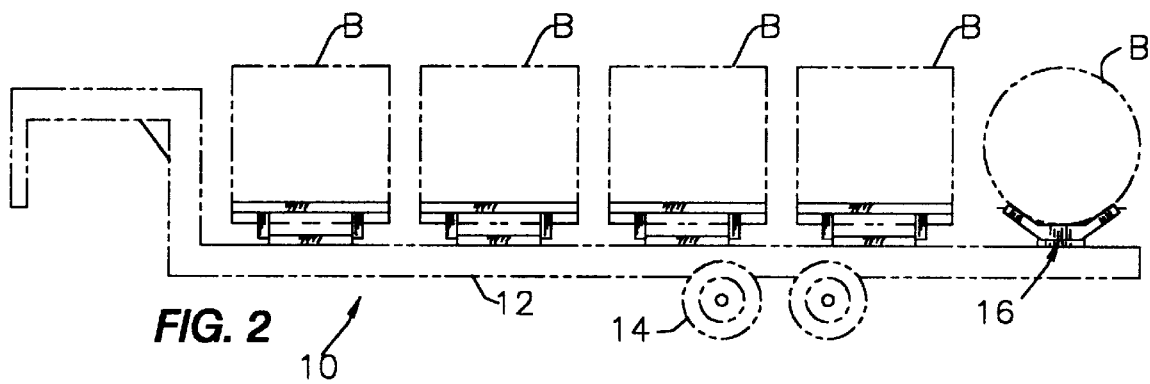
FIG. 2 is a schematic view generally similar to FIG. 1, but showing the end cradle mounted for unloading from the end of the trailer.
Figure 3:
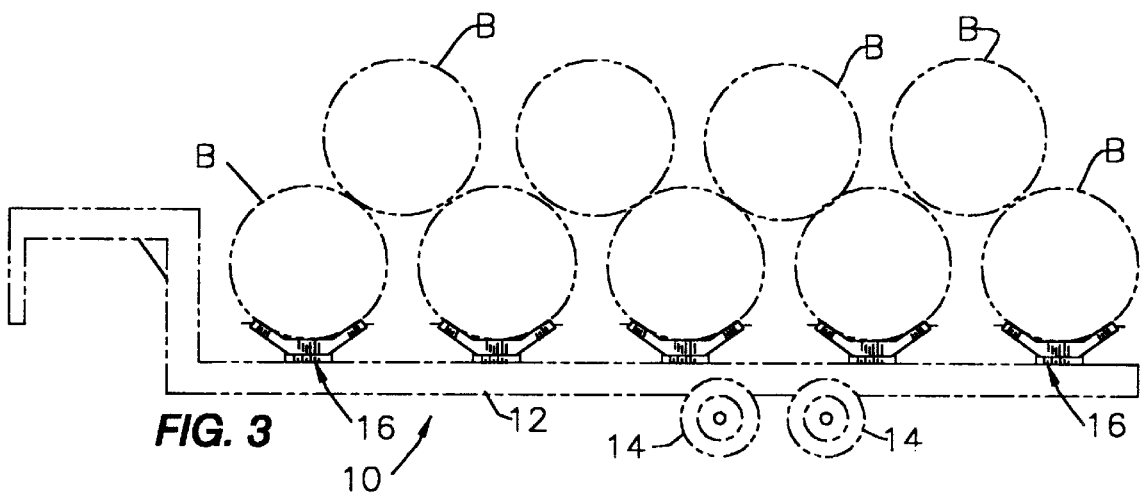
FIG. 3 is a schematic view of the trailer shown in FIGS. 1 and 2 in which stacked cylindrical hay bales are arranged for unloading by a spear-type unloader.

Referring now to FIGS. 1–3, a trailer is shown schematically generally at 10 including a frame 12 and wheels 14 for over the road or over the field transport. The plurality of cylindrical hay bales are shown at B supported on cradle assemblies generally indicated at 16. FIG. 1 shows cylindrical bales B with longitudinal axes parallel to a longitudinal axis of trailer 10. FIG. 2 shows the end bale B and the end cradle assembly 16 having longitudinal axes extending transversely of the longitudinal axis of trailer 10. FIG. 3 shows an upper row of cylindrical bales B supported on a lower row of bales B with longitudinal axes of bales B and cradle assemblies 16 extending transversely of frame 12.

Figure 4:
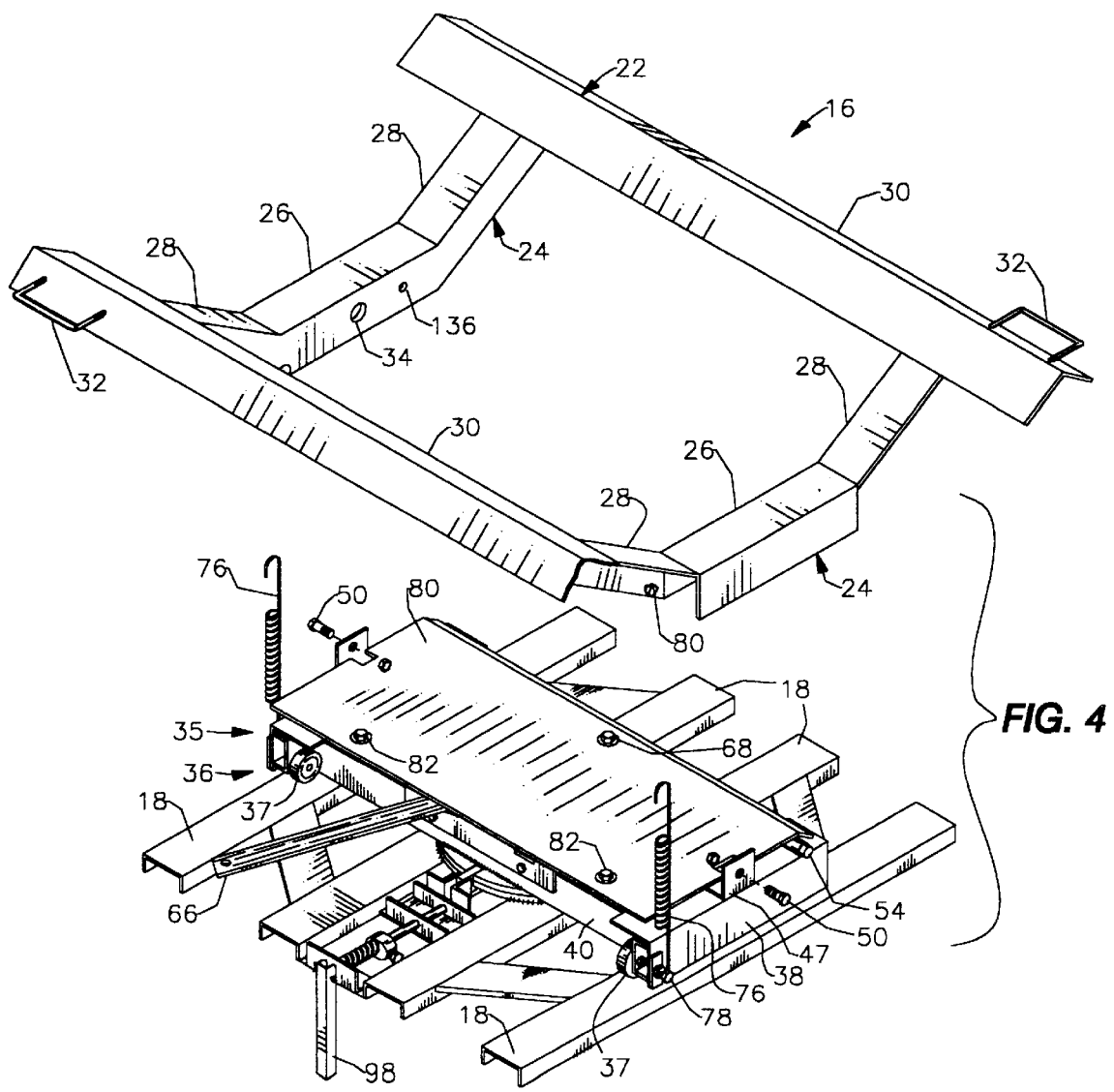
FIG. 4 is an exploded view of a cradle and supporting turntable for rotation of the cradle.
Figure 5:
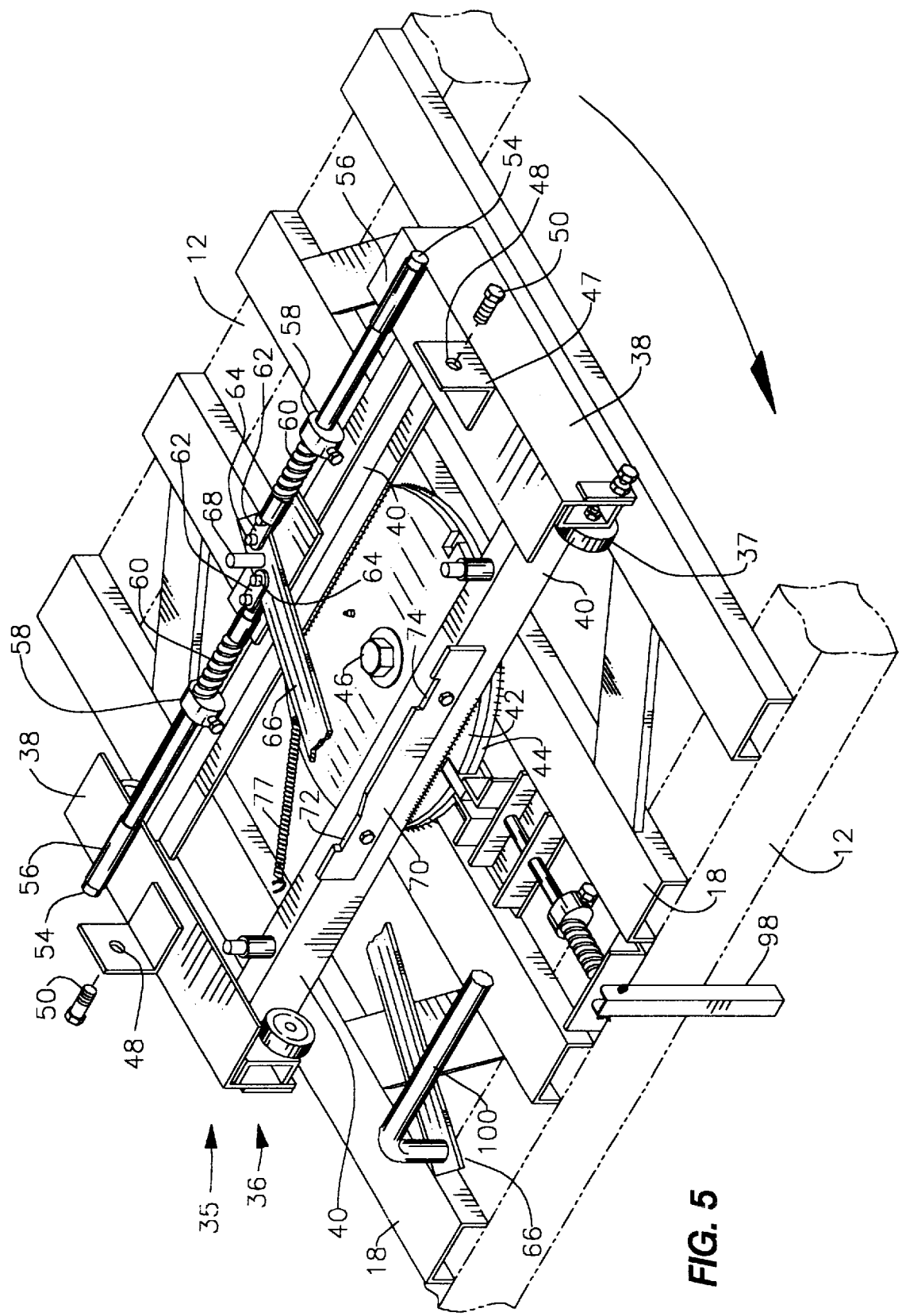
FIG. 5 is a perspective view of the turntable for selective rotation of the cradle among three separate positions.

Referring now to FIGS. 4–6 particularly, frame 12 of trailer 10 has a plurality of spaced transverse frame members 18. Such transverse frame members 18 are mounted on frame 12 as illustrated in FIG. 5. Cradle assembly 16 as shown in FIG. 4 includes a cradle 22 which includes opposed trough-shaped ends generally indicated at 24. Each end 24 includes a channel-shaped base 26 and inclined upper side arms 28. Upper sides 30 extend between ends 24 and have hand holds 32 thereon for manual gripping of cradle 22. Such hand holds 32 can be used for manual dumping of the cradle. Base 26 is channel-shaped with a side having a pivot opening 34 for pivoting of cradle 22 and a locking opening 136 for releasable locking of cradle 22 as will be explained below.

Mounted beneath cradle 16 is a turntable assembly generally indicated at 35 on which cradle 22 is supported. Turntable assembly 35 includes a carriage 36 having transverse frame members 38 and longitudinal frame members 40. Frame members 40 are secured, such as by welding, to an upper turntable plate 42. A lower turntable plate 44 is fixed to transverse frame members 18 and upper plate 42 is connected to lower plate 44 by a suitable bolt 46 to permit rotation of upper turntable plate 42 relative to the lower supported plate 44.

A bracket 47 on transverse frame member 38 has an opening 48 therein alignable with opening 34 of cradle 22 with a suitable nut and bolt combination 50 connecting cradle 22 to brackets 47 for pivotal and tilting movements.

A releasable locking mechanism includes a pair of locking pins 54 received within sleeves 56 fixed to frame members 38. A collar 58 is secured to each pin 54 and springs 60 urge pins 54 outwardly. A link 62 is pivotally mounted at 64 to a lever 66 which is mounted for pivotal movement about pin 68. A lever positioning bar 70 is secured to frame member 40 and has a pair of slots 72 and 74 therein. A spring 77 is connected between lever 66 and transverse frame member 18 to urge lever 66 continuously towards a locked position with pins 54 engaging openings 136 in cradle 22 to maintain cradle 22 in an upright transport position. To remove pins 54 from locking engagement with cradle 22 to permit manual tilting of cradle 22, lever 66 is manually moved to slot 74 for unloading a bale B from one side of trailer 10.

Figure 9:
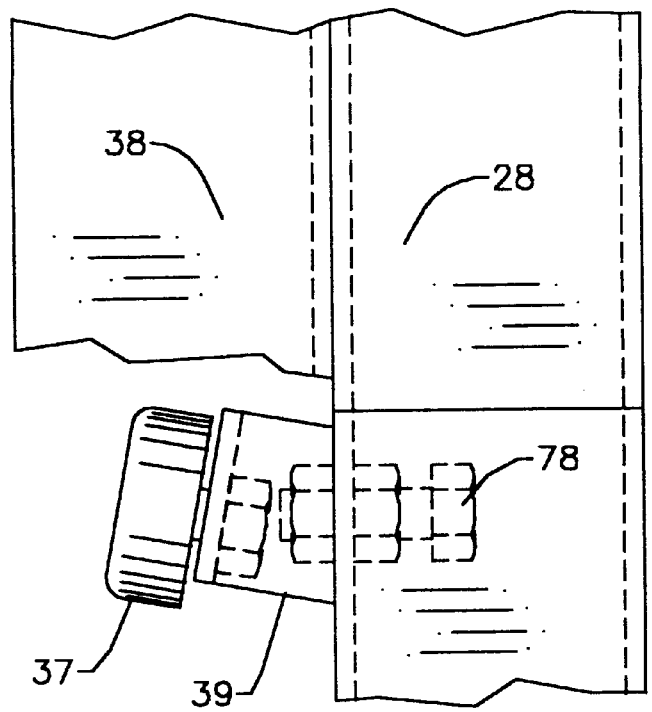
FIG. 9 is a plan view of a roller supporting the turntable for pivotal movement about a vertical axis.
Figure 8:
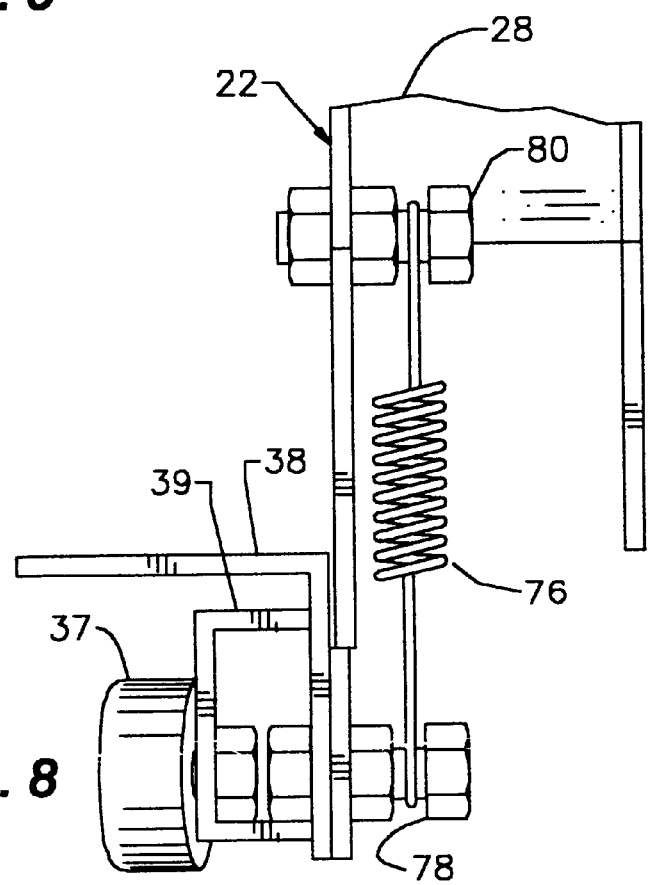
FIG. 8 is an elevational view of the spring for effecting tilting of an associated cradle upon actuation of the releasable locking means for the cradle.

Referring to FIGS. 4 and 8, a return spring is shown at 76 having a lower end anchored to bolt 78 secured to transverse frame member 38. The upper end of spring 76 is secured to bolt 80 on an inclined arm 28 of trough-shaped end 24 as shown also in FIG. 4. Rollers 37 are mounted on roller support 39 for rotation about an inclined axis as shown in particularly in FIG. 9. Lever 66 when moved to slot 74, maintains pins 54 in a retracted position relative to openings 136 for permitting manual tilting or pivoting of cradle 22. Springs 76 provide torque for return of cradle 22 to an upright position. Lever 66, when moved to the slot 72, forces pins 54 outwardly for engagement into openings 136 for locking cradle 22 in an upright position. A cover plate 80 is secured to carriage 34 by bolts 82 and by a nut on the upper end of pivot pin 68 as shown particularly in FIG. 4 thereby to provide a protective covering for the operating mechanism.

It is desirable that cradles 22 be capable of unloading from either side of trailer 10. It also may be desirable at times for the rear end cradle 22 to be unloaded from the rear end of the trailer 10 instead of a side, such as unloading at a gate, or in a barn, for example. For this purpose, upper turntable plate 42 as shown particularly in FIGS. 6 and 7 has three slots 88 therein adapted for engagement by a removable detent 90. Detent 90 on an end of rod 91 has a collar 92 thereon and a spring 94 compressed between angle 96 and collar 92 continuously urges detent 90 into engagement with slot 88. A manually operated handle 98 is pivotally mounted to an extending end of rod 91. To move detent 90 to a disengaged position with slot 88, handle 98 is manually pivoted to a horizontal position with handle 98 pulling rod 91 and detent 90 outwardly for disengagement of detent 90 with slot 88. When detent 90 is disengaged, carriage 36 is rotated by manual rotation of cradle 22 for movement of cradle 22 to a desired position either for unloading from a rear end of the trailer or for unloading from the other side of the trailer.

Figure 10:
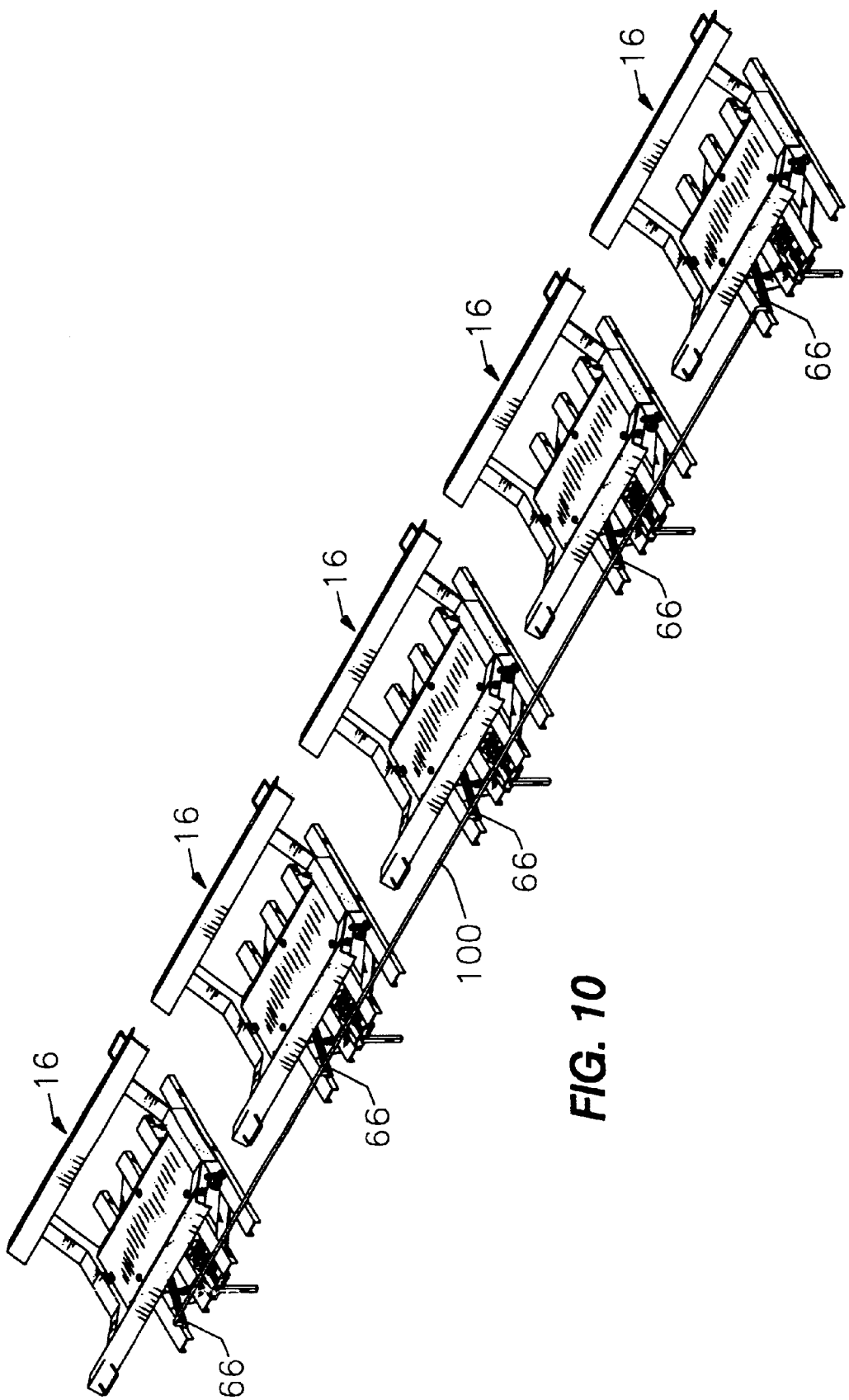
FIG. 10 is a perspective view of a plurality of cradles showing a manually operated rod connected to unlocking levers for the cradles to provide a simultaneous unlocking of the cradles for simultaneous tilting movement for unloading the hay bales simultaneously.

To unload all cradles 22 from one side of trailer 10 as shown particularly in FIG. 10, levers 66 are connected to an actuating rod 100. Upon manual operation of rod 100 with levers 66 in slot 72, levers 66 are moved to slots 74 in which position pins 54 are simultaneously removed from openings 136 of cradles 22. The cradles are pivoted manually, each individually. Springs 76 return cradles 22 to normal hauling position.

As described above, a hay bale trailer 10 is provided that permits cylindrical hay bales B to be unloaded from either side of trailer 10 and, if desired, to be unloaded by manual pivoting of each individual cradle. Further, if desired, the rear end hay bale B may be unloaded from the rear end of trailer 10. Either a fork-type loader or a spear-type loader may be utilized with the present invention.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A hay bale trailer for transporting and unloading hay bales comprising:

a longitudinally extending trailer;

a plurality of cradles supported on said trailer, each cradle having a base and a pair of opposed side wings extending upwardly from opposed sides of said base and inclined outwardly from said base to receive a hay bale thereon;

a mounting arrangement disposed between each of said cradles and said trailer, each mounting arrangement being arranged and designed for manual continuous rotation while carrying a cradle about a vertical axis on said trailer between one position for unloading from one side of the trailer and a second position for unloading from the opposite side of the trailer; and a tilting arrangement provided between each of said cradles and a corresponding mounting arrangement for tilting movement about a horizontal axis on said trailer for unloading of hay bales supported on said cradles from one side and said opposite side of the trailer.

2. A hay bale trailer as set forth in claim 1 wherein each said mounting arrangement includes a turntable supporting an associated cradle, and a manual disengagement device for selectively disengaging each turntable to permit said free rotation of an associated cradle.

3. A hay bale trailer as set forth in claim 2 wherein a carriage supporting a cradle therein is mounted on each turntable and is movable 180 degrees about a vertical axis.

4. A hay bale trailer as set forth in claim 2 wherein said manual disengagement device includes a manually releasable detent for engaging said turntable to prevent rotation of said turntable and upon release permitting rotation of said cradle.

5. A hay bale trailer as set forth in claim 2 further comprising a releasable locking means to prevent tilting of said cradles when in a locked transport position and to permit tilting of said cradles in an unlocked unloading position.

6. A hay bale trailer as set forth in claim 5 wherein said releasable locking means comprises a pair of opposed locking pins engaging opposed ends of said cradles to prevent tilting of said cradles; and a manually operated lever is operatively connected to said pins for release of said pins to a disengaged position to permit manual tilting of said cradles to an unloading position.

7. A hay bale trailer as set forth in claim 6 wherein a single manually actuated member is connected to said levers for simultaneous release of said pins to permit individual tilting of said cradles to an unloading position.

8. A hay bale trailer as set forth in claim 1 wherein said means for mounting said cradles for manual continuous rotation about a vertical axis includes means for locking of the cradle on the rear end of the trailer to a transverse position relative to a longitudinal axis of said trailer to permit unloading from the rear end of the trailer.

9. Apparatus for transporting cylindrical hay bales including;

a trailer having a longitudinal axis;

a cradle supported on said trailer, said cradle designed and arranged to support a cylindrical hay bale;

a rotatable mounting structure coupled between said trailer and said cradle and which is arranged and designed to be manually continuously rotated through at least ninety degrees about a vertical axis on said trailer; and a pivotable structure disposed between said rotatable mounting structure and said cradle, said pivotable structure arranged and designed for tilting of said cradle about a horizontal axis which is transverse to said longitudinal axis of said trailer for dumping a hay bale from a rear end of said cradle or alternatively about a horizontal axis which is parallel to said longitudinal axis of said trailer for dumping a said hay bale from a side of said cradle.

10. The apparatus of claim 9 wherein said rotatable mounting structure is arranged and designed for orienting a side of said cradle parallel to a first longitudinal side of said trailer and for orienting said side of said cradle parallel to a rear end of said trailer.

11. The apparatus of claim 9 wherein said rotatable mounting structure is arranged and designed for orienting a side of said cradle parallel to said first longitudinal side of said trailer and for orienting said side of said cradle parallel to a second longitudinal side of said trailer which is opposite said first longitudinal side of said trailer.

12. A hay bale trailer for transporting and unloading hay bales comprising:

a trailer having a trailer longitudinal axis;

a plurality of open ended cradles supported on said trailer, each cradle having a base defining a cradle longitudinal axis and a pair of opposed side wings extending upwardly from opposed sides of said base and inclined outwardly from said base to receive a hay bale thereon;

a plurality of turntable assemblies mounted on said trailer for supporting each of said cradles, each turntable assembly including, a turntable which carries one of said cradles and is mounted on said frame for 180° rotation about a vertical axis in order that said cradles can be oriented in a first position with said cradle longitudinal axis parallel to said trailer longitudinal axis, or oriented in a second position with said cradle longitudinal axis transverse to said trailer longitudinal axis, or oriented in a third position with said cradle longitudinal axis parallel to said trailer longitudinal axis but turned 180° from said first position, at least three slots in a peripheral edge of said turntable with first and second slots spaced at 90° intervals from each other and with second and third slots spaced at 90° intervals from each other, and a manually releasable detent for engaging one of said slots to prevent rotation of said turntable and position said turntable in one of said first, second or third positions, said turntable being arranged and designed to be freely manually rotated while carrying one of said cradles when said detent is not in one of said three slots, and means for mounting each of said cradles on one of said turntables for pivoting about said cradle longitudinal axis, whereby, each of said cradles is capable of unloading a hay bale supported thereon from opposite sides of said trailer when a respective turntable is in a first or third position, and a cradle positioned at the rear end of the trailer is further capable of unloading a hay bale supported thereon from the rear of said trailer.

13. The hay bale trailer of claim 12 further comprising:

releasable locking means for preventing tilting of said cradles when in a locked transport position and for permitting tilting of said cradles in an unlocked unloading position.

14. The hay bale trailer of claim 13 further comprising:

said releasable locking means comprises a pair of opposed locking pins engaging opposed ends of said cradles to prevent tilting of said cradles; and a manually operated lever operatively connected to said pins for release of said pins to a disengaged position to permit tilting of said cradles to an unloading position.

15. The hay bale trailer of claim 14 wherein, a single manually actuation member is connected to a plurality of said levers for simultaneous release of said locking pins to permit individual tilting of each of a respective plurality said cradles to an unloaded position.

* * * * *